United States Patent
Kudana et al.

(10) Patent No.: US 9,635,385 B2
(45) Date of Patent: Apr. 25, 2017

(54) METHODS AND SYSTEMS FOR ESTIMATING MOTION IN MULTIMEDIA PICTURES

(75) Inventors: Arun Shankar Kudana, Bangalore (IN); Soyeb Nagori, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1162 days.

(21) Appl. No.: 13/442,908

(22) Filed: Apr. 10, 2012

(65) Prior Publication Data

US 2012/0263227 A1    Oct. 18, 2012

(30) Foreign Application Priority Data

Apr. 14, 2011   (IN) .......................... 1294/CHE/2011

(51) Int. Cl.
| | | |
|---|---|---|
| *H04N 7/12* | (2006.01) |
| *H04N 11/02* | (2006.01) |
| *H04N 11/04* | (2006.01) |
| *H04N 19/58* | (2014.01) |
| *H04N 19/56* | (2014.01) |
| *H04N 19/105* | (2014.01) |
| *H04N 19/513* | (2014.01) |
| *H04N 19/112* | (2014.01) |

(52) U.S. Cl.
CPC ........... *H04N 19/58* (2014.11); *H04N 19/105* (2014.11); *H04N 19/112* (2014.11); *H04N 19/513* (2014.11); *H04N 19/56* (2014.11)

(58) Field of Classification Search
CPC ............................ H04N 7/50; H04N 7/26244
See application file for complete search history.

(56) References Cited

U.S. PATENT DOCUMENTS 5,751,364 A * 5/1998 Yasuda ................. H04N 19/51
348/699
2009/0323826 A1* 12/2009 Wu ...................... H04N 19/895
375/240.27

* cited by examiner

*Primary Examiner* — Chikaodili E Anyikire
(74) *Attorney, Agent, or Firm* — Gregory J. Albin; Charles A. Brill; Frank D. Cimino

(57) ABSTRACT

Several methods and systems for estimating motion in a plurality of multimedia pictures are disclosed. In an embodiment, at least one temporal distance between a multimedia picture and one or more reference pictures corresponding to the multimedia picture in a capture order associated with the plurality of multimedia pictures is computed. The at least one temporal distance is computed subsequent to an encoding of the multimedia picture. At least one motion estimation parameter is determined based on the at least one temporal distance. Motion associated with a subsequent multimedia picture to be encoded is estimated based on the at least one motion estimation parameter.

17 Claims, 8 Drawing Sheets

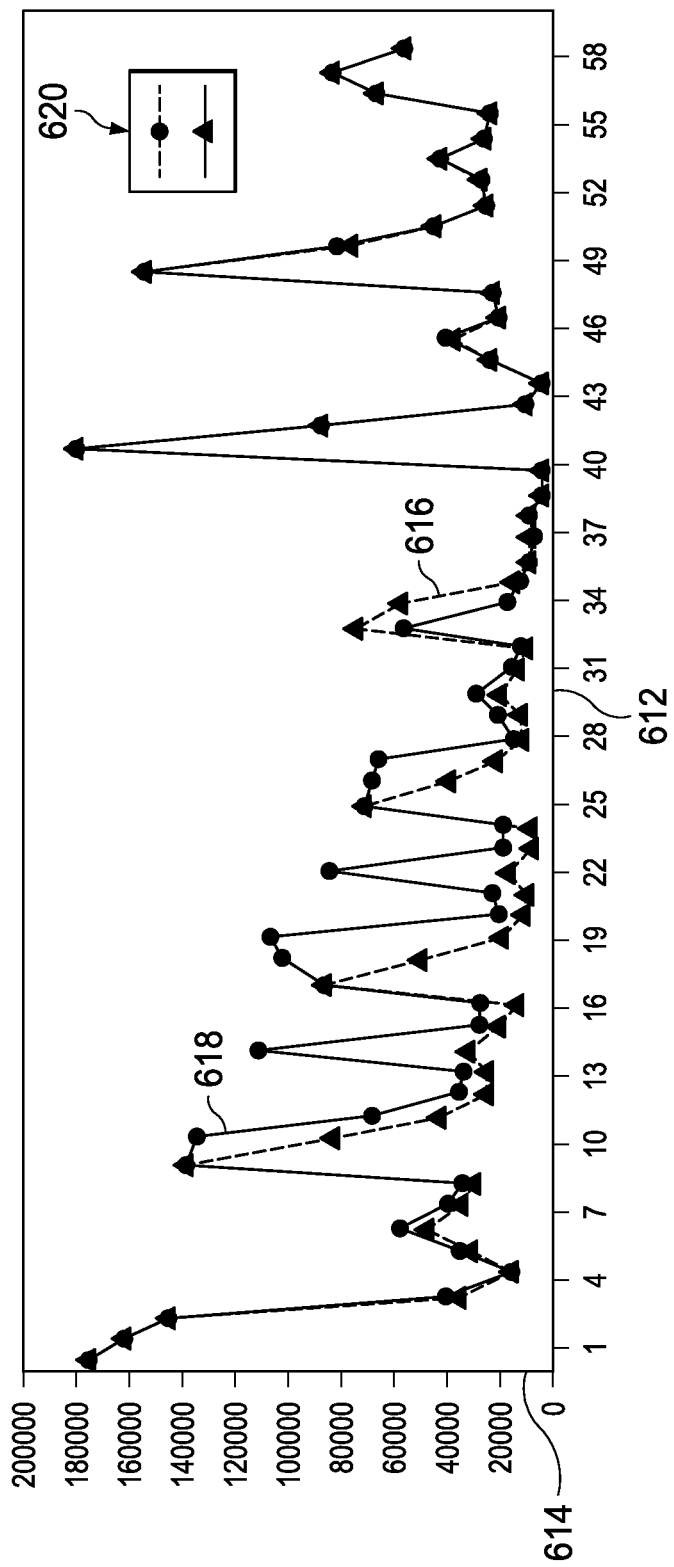

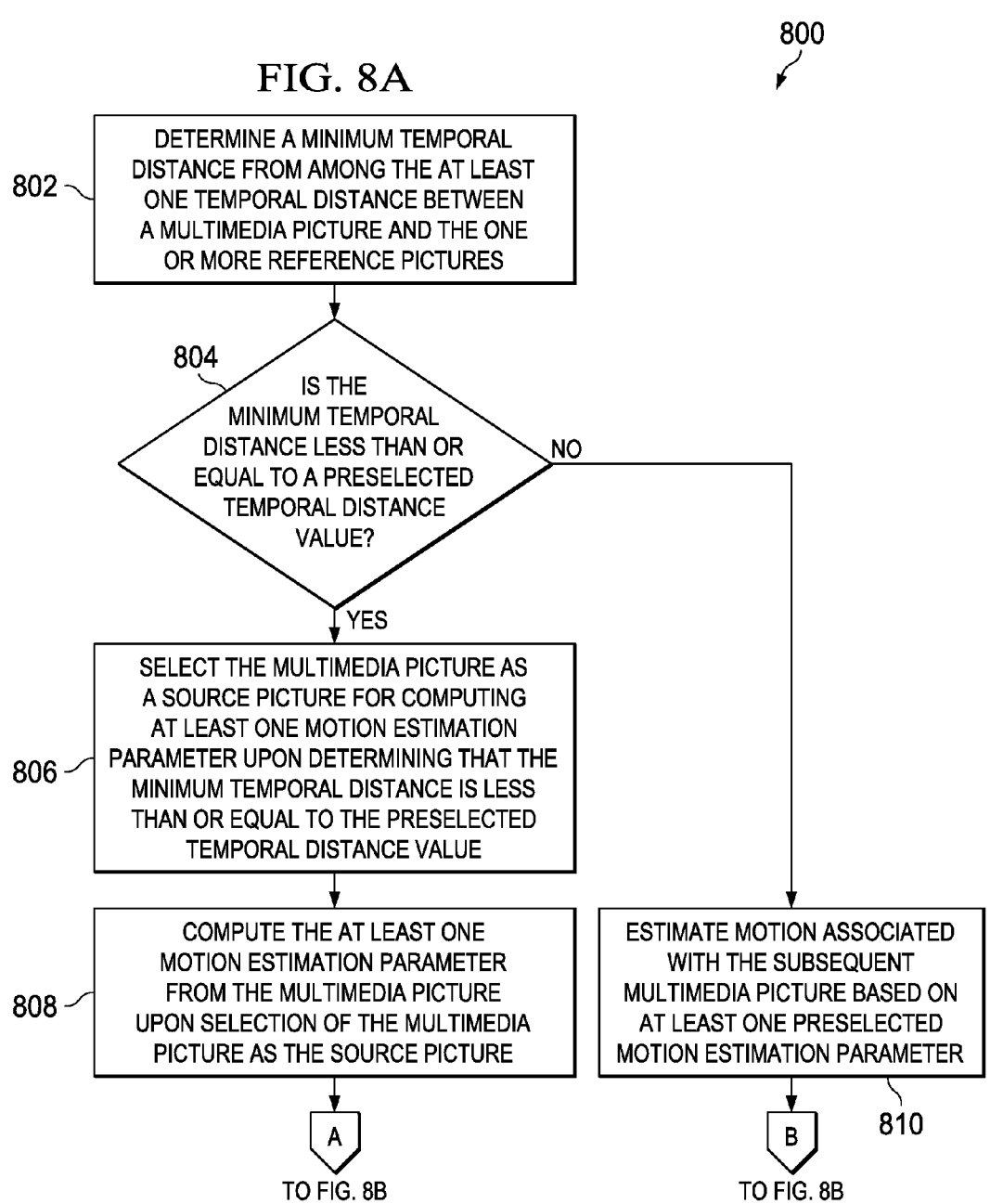

METHODS AND SYSTEMS FOR ESTIMATING MOTION IN MULTIMEDIA PICTURES

CROSS REFERENCE TO RELATED APPLICATIONS

This application claims the benefit of provisional patent application number 1294/CHE/2011, filed on Apr. 14, 2011, in the Indian Patent Office, which is incorporated herein by reference in its entirety.

TECHNICAL FIELD

The present disclosure generally relates to the field of motion estimation.

BACKGROUND

Pursuant to an exemplary scenario, multimedia data, such as video content, may include a plurality of multimedia pictures (e.g., multimedia frames or fields), and each multimedia picture may include several blocks of data. During an encoding of the multimedia data, a prediction for each block of multimedia data may be performed based on previously encoded blocks of multimedia data, either from a current multimedia picture (e.g., intra prediction) or from another multimedia picture that has already been encoded and transmitted (e.g., inter prediction). Identifying a suitable inter prediction may be referred to, for example, as motion estimation, and subtracting the inter prediction from the current block may be referred to, for example, as motion compensation. The motion estimation/compensation may be implemented so as to achieve a multimedia data compression by eliminating a temporal redundancy based on a correlation between multimedia pictures.

SUMMARY

Various methods and systems for estimating motion in multimedia pictures are disclosed. In an embodiment, a method for estimating motion in a plurality of multimedia pictures is provided. The method, performed by a processor, includes computing at least one temporal distance between a multimedia picture and one or more reference pictures corresponding to the multimedia picture in a capture order associated with the plurality of multimedia pictures. The term 'temporal distance', as used herein, may be construed as referring to a positional difference between a pair of multimedia pictures arranged in a capture order. The temporal distance may be computed in terms of temporal distance units. The at least one temporal distance is computed subsequent to an encoding of the multimedia picture. In an embodiment, a minimum temporal distance from among the at least one temporal distance between the multimedia picture and the one or more reference pictures is computed.

In an embodiment, the minimum temporal distance is compared with a preselected temporal distance value. In an embodiment, at least one motion estimation parameter is determined based on the at least one temporal distance. In an embodiment, the multimedia picture is selected as a source picture for computing at least one motion estimation parameter upon determining that the minimum temporal distance is less than or equal to the preselected temporal distance value. Upon selection of the multimedia picture as the source picture, the at least one motion estimation parameter is computed from the multimedia picture. The at least one motion estimation parameter includes at least one of a set of temporal predictors and a mean motion vector. The mean motion vector corresponds to a mean of all motion vectors in one or more regions of interest of the source picture selected for computing at least one motion estimation parameter for estimating motion in a subsequent multimedia picture. In an embodiment, each of the one or more regions of interest includes one or more blocks (e.g., macro blocks) within the source picture. In an embodiment, motion in a subsequent multimedia picture to be encoded is estimated based on the computed at least one motion estimation parameter. Upon determining that the minimum temporal distance is greater than a preselected temporal distance value, motion associated with the subsequent multimedia picture is estimated based on a preselected at least one motion estimation parameter.

Additionally, in an embodiment, a system for estimating motion in multimedia pictures is provided. The system includes a processor module and a motion estimation module. The processor module is configured to compute at least one temporal distance between a multimedia picture and one or more reference pictures corresponding to the multimedia picture in a capture order associated with the plurality of multimedia pictures. The at least one temporal distance is computed subsequent to an encoding of the multimedia picture. The motion estimation module is communicatively associated with the processor module and is configured to determine at least one motion estimation parameter based on the at least one temporal distance. The motion estimation module is also configured to estimate motion in a subsequent multimedia picture to be encoded based on the at least one motion estimation parameter.

Moreover, in an embodiment, a computer-implemented method of estimating motion in a plurality of multimedia pictures is provided. The method includes computing a minimum temporal distance from among at least one temporal distance between the multimedia picture and the one or more reference pictures corresponding to the multimedia picture in a capture order associated with the plurality of multimedia pictures, wherein the at least one temporal distance is computed subsequent to an encoding of the multimedia picture. The method also includes comparing the minimum temporal distance with a preselected temporal distance value corresponding to two or more temporal distance units. The method further includes performing one of selecting the multimedia picture as a source picture for computing at least one motion estimation parameter upon determining that the minimum temporal distance is less than or equal to the preselected temporal distance value and estimating motion in the subsequent multimedia picture based on a preselected at least one motion estimation parameter upon determining that the minimum temporal distance is greater than a preselected temporal distance value.

BRIEF DESCRIPTION OF THE FIGURES

FIGS. 6A and 6B illustrate an improvement of a perceptual multimedia quality on performing a source picture selection as explained in FIG. 4, pursuant to an exemplary scenario;

FIGS. 8A and 8B depict a flow diagram of a method of source picture selection that may be implemented to estimate motion in a plurality of multimedia pictures according to an embodiment.

DETAILED DESCRIPTION

Pursuant to an exemplary scenario, a motion estimation/compensation procedure is performed so as to achieve a multimedia data compression by eliminating a temporal redundancy based on a correlation between multimedia pictures. The motion estimation for a multimedia picture is performed based on a previously encoded multimedia picture. The multimedia pictures may include, for example, multimedia frames, fields (e.g., a top field or a bottom field of interlaced multimedia content), and the like. In certain exemplary applications, the most recently encoded predictive picture (which may be referred to as the "P-picture") is selected for estimating motion in the multimedia pictures until the next P-picture is encoded. There may be significant amount of motion involved and/or a sizable change in intensity between two P-pictures, and estimating motion in the multimedia pictures based on the previously encoded P-picture at a large temporal distance from the multimedia pictures may be sub-optimal. Various embodiments of the present technology, however, provide systems and methods for estimating motion in multimedia pictures that are capable of overcoming these and other obstacles and providing additional benefits The following description and accompanying figures demonstrate that the present technology may be practiced, or otherwise implemented, in a variety of different embodiments. It should be noted, however, that the scope of the present technology is not limited to any or all of the embodiments disclosed herein. Indeed, one or more of the devices, features, operations, processes, characteristics, or other qualities of a disclosed embodiment may be removed, replaced, supplemented, or changed.

Figure 1:
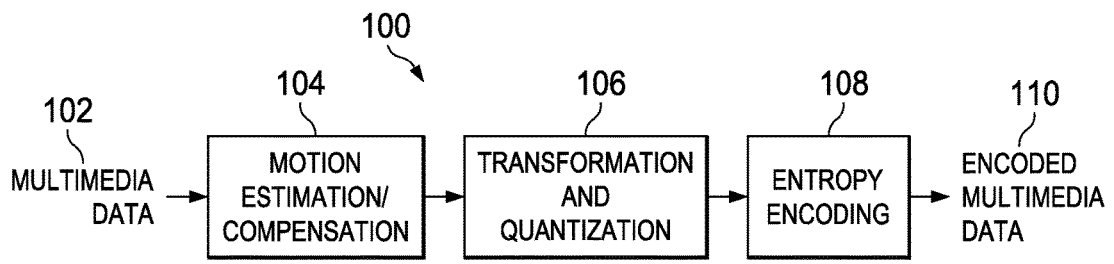
FIG. 1 illustrates an overview of a multimedia data encoding process according to an exemplary scenario.

FIG. 1 illustrates an overview of a multimedia data encoding process in accordance with an exemplary scenario. More particularly, FIG. 1 illustrates a simplified overview of an encoding process flow 100 for encoding multimedia data 102. Pursuant to an exemplary scenario, a multimedia encoder may perform the encoding process flow 100 so as to achieve a compression of the multimedia data 102. The multimedia data 102 may be compressed so as to efficiently utilize a storage capacity during storage or a spectrum/bandwidth during transmission.

The multimedia encoder may be configured within a multimedia system. Examples of the multimedia system may include, but are not limited to, (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers. Pursuant to an exemplary scenario, the multimedia encoder may be any machine capable of executing a set of instructions (sequential and/or otherwise) so as to perform an encoding of multimedia data.

The multimedia data 102 may be received by the multimedia encoder from a media capture device. Examples of a media capture device may include, but are not limited to, a video camera and a camcorder. The media capture device may be, for example, a stand-alone device or a part of a mobile device, such as, for example, a Smartphone, or a data processing device, such as, for example, a personal computer, a laptop device or a personal digital assistant (PDA). The multimedia data 102 may also be received by the multimedia encoder from a transcoding system, which may be a stand-alone device or a part of a media capture device. Examples of multimedia data 102 may include, for example, video data, image data, audio-video data, graphical data, textual data or any combination thereof.

Pursuant to an exemplary scenario, the multimedia data 102 may include a plurality of multimedia pictures, and each multimedia picture from among the plurality of multimedia pictures may include several blocks of data. During motion estimation/compensation 104 of the encoding process flow 100, a prediction for each block from among a number of blocks of multimedia data 102 is determined and subtracted from the block so as to form residual multimedia data. The prediction for each block of multimedia data 102 may be performed based on previously encoded blocks of multimedia data 102, either from a current frame (e.g., intra prediction) or from other frames that have already been encoded and transmitted (e.g., inter prediction). Identifying a suitable inter prediction may be referred to, for example, as "motion estimation", and subtracting the inter prediction from the current block may be referred to, for example, as "motion compensation".

After motion estimation/compensation 104, and during transformation/quantization 106, the residual multimedia data is transformed and quantized. The transformation of the residual multimedia data outputs a set of transform coefficients, each of which is a weighting value for a standard basis pattern. The weighted basis patterns, when combined, are capable of recreating the residual multimedia data. The set of transform coefficients are then quantized (such as where each coefficient is scaled corresponding to a scale-down factor which may be a mathematical reciprocal of the scale-up factor specified by a multimedia standard, thereby effectively setting a number of transform coefficients to a relatively small value (including a zero value)) so as to achieve compression.

The quantized transform coefficients, along with certain information (such as, for example, information about the structure of compressed data, information about a complete sequence of multimedia data 102 and/or information that enables a decoder to re-create the prediction), are subject to entropy encoding 108 (e.g., conversion into binary codes using variable length coding and/or arithmetic coding). The entropy encoding 108 of the multimedia data 102 produces an efficient, compact and binary representation of the information in the form of encoded multimedia data 110. The encoded multimedia data 110 may then be stored and/or transmitted. A system for estimating motion in a plurality of multimedia pictures, such as during motion estimation/compensation 104 of the encoding process flow 100, is described in FIG. 2.

Figure 2:
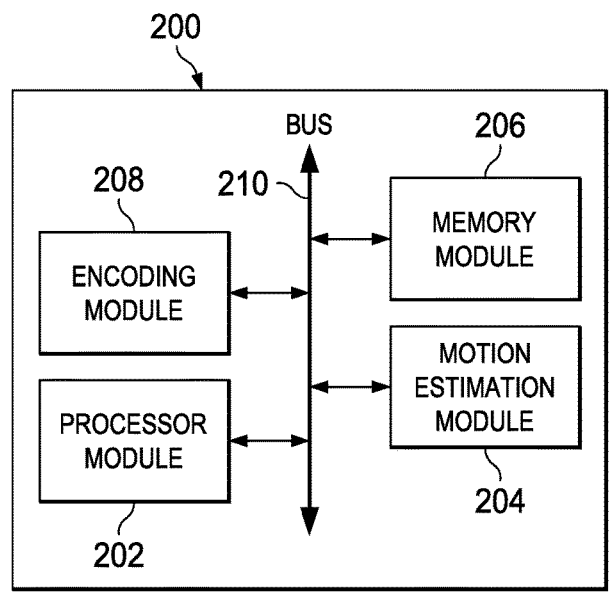
FIG. 2 is a block diagram of an exemplary system for estimating motion in multimedia pictures according to an embodiment.

FIG. 2 is a block diagram of an exemplary system 200 for estimating motion in a plurality of multimedia pictures, according to an embodiment. In an embodiment, the system 200 is configured to be included within a multimedia encoder. In an embodiment, the system 200 may be communicatively associated with a multimedia encoder such that a plurality of multimedia pictures may be received and such that motion compensated multimedia pictures may be provided to the multimedia encoder. The plurality of multimedia pictures may include, for example, multimedia frames, fields (e.g., a top field or a bottom field of an interlaced multimedia content), and the like. Furthermore, the plurality of multimedia pictures may be associated with various multimedia content types, such as, for example, progressive multimedia content, interlaced multimedia content, and the like. In an exemplary embodiment, the system 200 may be configured within a personal computer (PC), a tablet PC, a PDA, a mobile communication device, a web appliance, a set-top box (STB), an embedded system and/or any machine capable of executing a set of instructions (sequential and/or otherwise) so as to perform selection of a multimedia picture as a source picture for computation of at least one motion estimation parameter for motion estimation in the plurality of multimedia pictures.

The term 'source picture', as used herein, may be construed as referring to a multimedia picture from among the plurality of multimedia pictures, selected for computing at least one motion estimation parameter for performing motion estimation in a subsequent multimedia picture in an encoding order associated with the plurality of multimedia pictures. The at least one motion estimation parameter includes at least one of a set of temporal predictors and a mean motion vector. The mean motion vector corresponds to a mean of all motion vectors in one or more regions of interest of the source picture. In an embodiment, each of the one or more regions of interest includes one or more blocks (e.g., macro blocks) within the source picture. The at least one motion estimation parameter may be selected based on a backward reference picture (e.g., a temporally succeeding reference picture in the encoding order) associated with the source picture or a forward reference picture (e.g., a temporally preceding reference picture in the encoding order) associated with the source picture.

In an embodiment, the system 200 includes a processor module 202, a motion estimation module 204, a memory module 206 and an encoding module 208. In an embodiment, the processor module 202, the motion estimation module 204, the memory module 206 and/or the encoding module 208 are configured to communicate with each other via or through a bus 210. Examples of the bus 210 may include, but are not limited to, a data bus, an address bus, a control bus, and the like. The bus 210 may be, for example, a serial bus, a bi-directional bus or a unidirectional bus. Examples of the memory module 206 may include, but are not limited to, random access memory (RAM), dual port RAM, synchronous dynamic RAM (SDRAM), double data rate SDRAM (DDR SDRAM), and the like. In an embodiment, the encoding module 208 may include one of an entropy encoder, as explained herein with reference to FIG. 1, and an encoder configured with the transformation/quantization and entropy encoding capabilities.

In an embodiment, the processor module 202 may be configured to receive a plurality of multimedia pictures along with capture order information and encoding order information. The plurality of multimedia pictures, along with the capture order information and the encoding order information, may be stored in the memory module 206 or may be received from an external storage device, such as, for example, an external memory or a memory location within a media capture device, such as, for example, a camera device. The processor module 202 is configured to compute at least one temporal distance between a multimedia picture and one or more reference pictures corresponding to the multimedia picture in a capture order associated with the plurality of multimedia pictures. The computation of the one or more temporal distances between a multimedia picture and one or more reference pictures is explained herein with reference to FIG. 3. The processor module 202 is further configured to compare the minimum temporal distance with a preselected temporal distance value.

During an initiation of an encoding of the multimedia pictures that are arranged in a capture order sequence, the preselected temporal distance value may be initially set to a value equal to or greater than a temporal distance between a first multimedia picture and a reference picture associated with the first multimedia picture, wherein the first multimedia picture is a first picture from among a plurality of multimedia pictures corresponding to a group of pictures (GOP) aligned to be encoded in an encoding order. In an embodiment, the preselected temporal distance value is chosen to be greater than or equal to two temporal distance units for an adaptive field referencing pattern encoding of the plurality of multimedia pictures. Motion estimation of a plurality of multimedia pictures subjected to the adaptive field referencing pattern encoding is described further in FIG. 5.

The processor module 202 is further configured to select the multimedia picture as a source picture for computing at least one motion estimation parameter upon or subsequent to determining that the minimum temporal distance is less than or equal to the preselected temporal distance value. The selection of the source picture is explained further herein with reference to FIG. 4. The motion estimation module 204 is configured to determine at least one motion estimation parameter from the multimedia picture upon or subsequent to selection of the multimedia picture as the source picture. In an embodiment, the motion estimation module 204 determines the at least one motion estimation parameter based on a backward reference picture (e.g., a temporally succeeding reference picture in an encoding order) associated with the multimedia picture selected as the source picture. In an embodiment, the motion estimation module 204 determines the at least one motion estimation parameter based on a forward reference picture (e.g., a temporally preceding reference picture in the encoding order) associated with the multimedia picture selected as the source picture.

In an embodiment, the motion estimation module 204 is configured to update the preselected temporal distance value to a value corresponding to the minimum temporal distance and/or update a preselected at least one motion estimation parameter to at least one motion estimation parameter computed from the selected multimedia picture that may be implemented to estimate motion in the subsequent multimedia picture. The updating may be performed upon or subsequent to selection of the multimedia picture as the source picture. In an embodiment, the preselected temporal distance and the preselected at least one motion estimation parameter and/or their subsequent updated values may be stored in the memory module 206. In an embodiment, upon or subsequent to selection of an adaptive field referencing pattern that may be implemented to encode multimedia pictures, the preselected at least one motion estimation parameter is updated, and the preselected temporal distance value is maintained at a value greater than or equal to two temporal distance units. The motion estimation module 204 is configured to estimate motion in the subsequent multimedia picture based on the preselected at least one motion estimation parameter upon or subsequent to determining that the minimum temporal distance is greater than a preselected temporal distance value.

The encoding module 208 is configured to encode the subsequent multimedia pictures based on the estimated motion in the subsequent multimedia pictures. In an embodiment, the system 200 may additionally include other components (not shown), such as, for example, an input unit (e.g., a multimedia processing device), a video display unit (e.g., a liquid crystals display (LCD), a cathode ray tube (CRT), and the like), a cursor control device (e.g., a mouse), a drive unit (e.g., a disk drive), a signal generation unit (e.g., a speaker) and/or a network interface unit. The drive unit includes a machine-readable medium upon which is stored one or more sets of instructions (e.g., software) embodying one or more of the methodologies and/or functions described herein. In an embodiment, the software resides, either completely or partially, within the memory module 206 and/or the processor module 202, and/or within the motion estimation module 204, during the execution thereof by the system 200 such that the processor module 202, the motion estimation module 204 and/or the memory module 206 also constitute machine-readable media.

The software may further be transmitted and/or received over a network via or through the network interface unit. The term "machine-readable medium" may be construed to include a single medium and/or multiple media (e.g., a centralized and/or distributed database, and/or associated caches and servers) that store the one or more sets of instructions. Moreover, the term "machine-readable medium" may be construed to include any medium that is capable of storing, encoding and/or carrying a set of instructions that may be executed by the system 200 such that the execution of these instructions causes the system 200 to perform one or more of the methodologies of the various embodiments. Furthermore, the term "machine-readable medium" may be construed to include, but shall not be limited to, solid-state memories, optical and magnetic media, and carrier wave signals.

Figure 3:
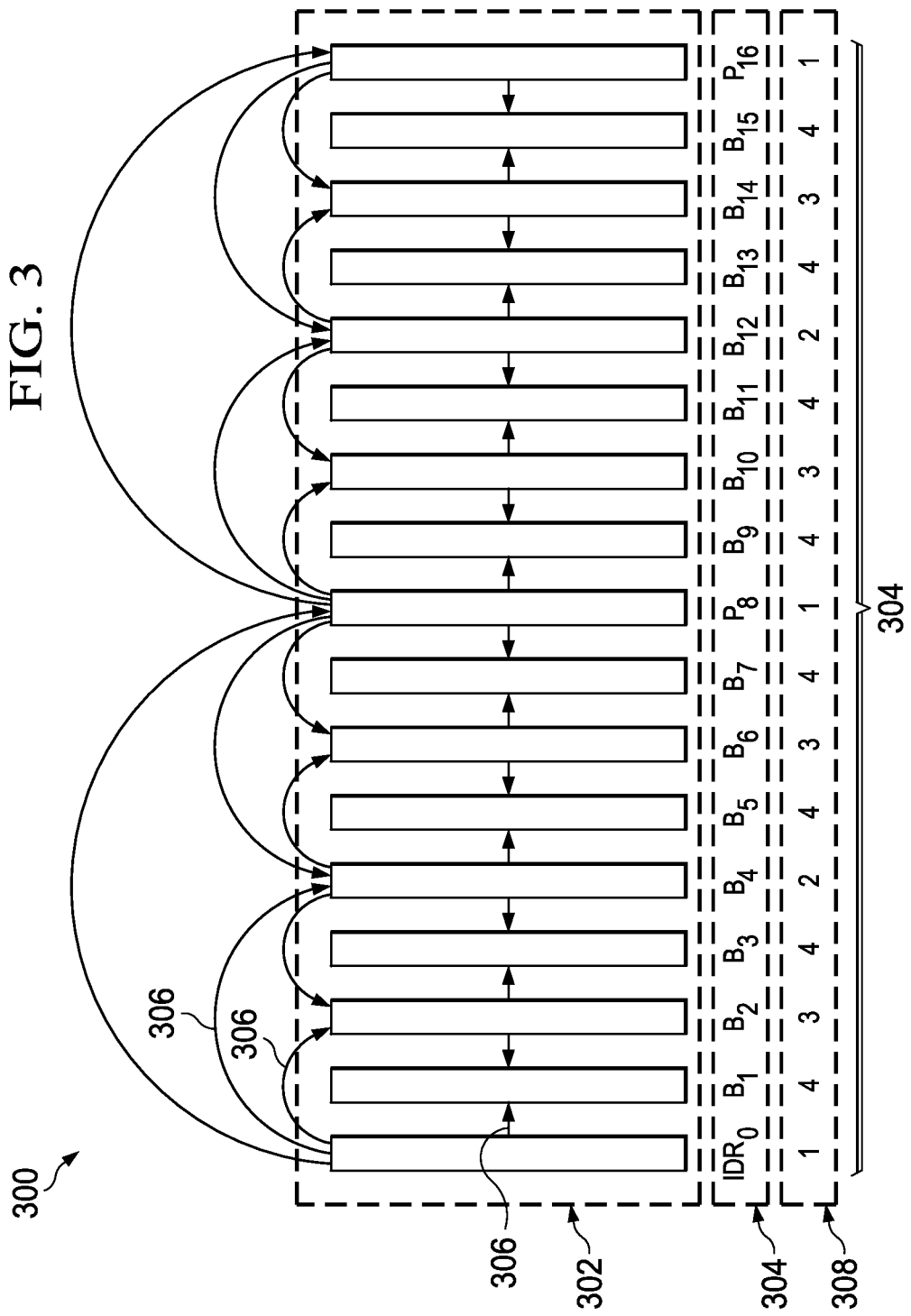
FIG. 3 illustrates a plurality of multimedia pictures arranged in an exemplary capture order, according to an embodiment.

FIG. 3 illustrates a plurality of multimedia pictures arranged in an exemplary capture order, according to an embodiment. More particularly, FIG. 3 depicts a hierarchical coding structure 300 that includes a plurality of multimedia picture 302 in a capture order sequence 304. A hierarchical coding structure 300 is defined to include a key picture and a plurality of pictures that are temporally located between the key picture and a previous key picture. Examples of the key picture may include, but is not limited to, an intra coded picture (I-picture), an instantaneous decoding refresh picture (IDR-picture), or a predictive picture (P-picture). The plurality of multimedia pictures 302 of the hierarchical coding structure 300 includes multimedia pictures $IDR_0$, $B_1$, $B_2$, $B_3$, $B_4$, $B_5$, $B_6$, $B_7$, $P_8$, $B_9$, $B_{10}$, $B_{11}$, $B_{12}$, $B_{13}$, $B_{14}$, $B_{15}$, and $P_{16}$. The arrows, such as arrows 306, depicted in FIG. 3 illustrate a dependence (or an association) of a multimedia picture on (or with) other multimedia pictures, such that a reference for encoding purposes is established. For example, the multimedia picture $B_3$ references the multimedia pictures $B_2$ and $B_4$, and the multimedia picture $B_4$ references the multimedia pictures $IDR_0$ and $P_8$, for encoding purposes.

Temporal levels 308 associated with the respective multimedia pictures are also depicted in FIG. 3. For example, multimedia pictures $B_1$, $B_3$, $B_5$, $B_7$, $B_9$, $B_{11}$, $B_{13}$, and $B_{15}$ are associated with temporal level 4, multimedia pictures $B_2$, $B_6$, $B_{10}$, and $B_{14}$ are associated with temporal level 3, multimedia pictures $B_4$ and $B_{12}$ are associated with temporal level 2, and the multimedia pictures $IDR_0$, $P_8$ and $P_{16}$ are associated with temporal level 1. As explained herein with reference to FIG. 2, the processor module 202 is configured to compute at least one temporal distance between a multimedia picture and one or more reference pictures associated with the multimedia picture in a capture order associated with the plurality of multimedia pictures. The processor module 202 is further configured to determine a minimum temporal distance from among the at least one temporal distance between the multimedia picture and the one or more reference pictures. The temporal distance is computed subsequent to the encoding of the multimedia picture. The term 'temporal distance', as used herein, may be construed, for example, as referring to a positional difference between a pair of multimedia pictures in the capture order sequence 304. The temporal distance may be computed in terms of temporal distance units.

A temporal distance unit of one may correspond to a time gap between a capture of a first multimedia picture and a second multimedia picture captured immediately before or subsequent to the capture of the first multimedia picture. For example, a reference picture for the multimedia picture $P_8$ is $IDR_0$. A temporal distance between the multimedia picture $P_8$ and $IDR_0$ in the capture order sequence 304 is accordingly computed to be 8 temporal distance units. A bi-directional picture (which may be referred to as a "B-picture") may refer to a pair of reference pictures and, correspondingly, is associated with a pair of temporal distances corresponding to the pair of reference pictures (e.g., a first temporal distance between the B-picture and a first reference picture and a second temporal distance between the B-picture and a second reference picture). The processor module 202 is configured to (1) determine which of the first temporal distance and the second temporal distance is lower and (2) identify the lesser of the first temporal distance and the second temporal distance as the minimum temporal distance. For example, if a temporal distance for the B-picture is 2 temporal distance units in a forward reference direction and 4 temporal distance units in a backward reference direction, then a minimum of the two temporal distances, i.e. 2 temporal distance units, is selected as the minimum temporal distance.

If a temporal distance in the forward reference direction and the backward reference direction is equal, then a minimum temporal distance may be selected to be one of the two temporal distance units. For example, the B-picture $B_4$ references multimedia pictures $IDR_0$ and $P8$, and a temporal distance can accordingly be computed to be 4 temporal distance units in the forward reference direction and the backward reference direction. Accordingly, the minimum temporal distance may be computed to be 4 temporal distance units. The processor module 202 is further configured to select a multimedia picture as a source picture for computing at least one motion estimation parameter for motion estimation in the subsequent multimedia picture, the selection performed based on the minimum temporal distance. The selection of a multimedia picture as the source picture is explained herein with reference to FIG. 4.

Figure 4:
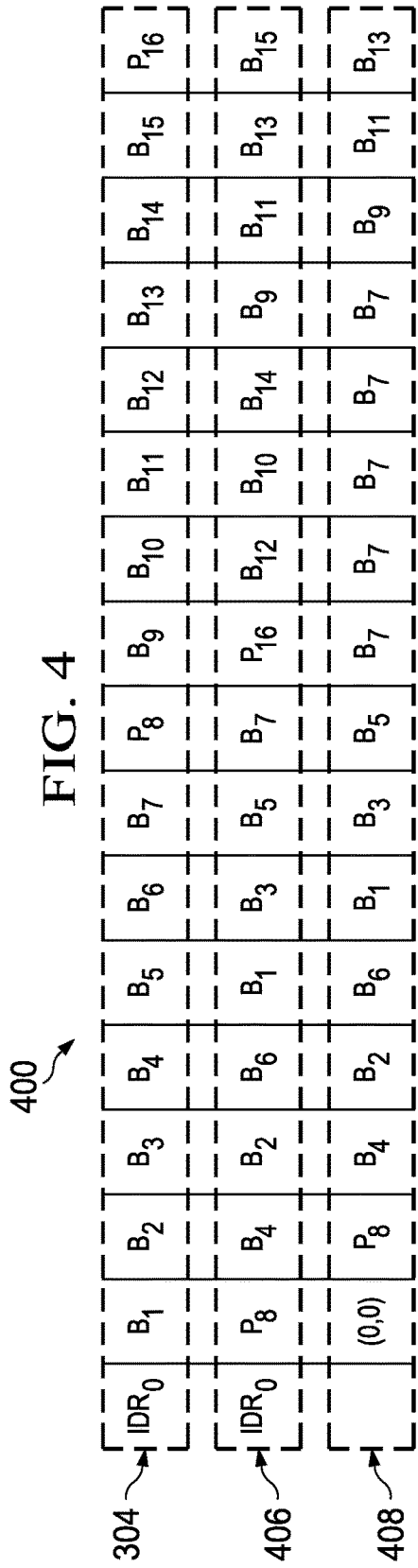
FIG. 4 illustrates an exemplary scheme for selecting a source picture from among the plurality of multimedia pictures of the hierarchical coding structure of FIG. 3, according to an embodiment.

FIG. 4 illustrates an exemplary scheme 400 for selecting a source picture from among the plurality of multimedia pictures of the hierarchical coding structure 300 of FIG. 3, according to an embodiment. More particularly, FIG. 4 depicts the capture order sequence 304, an encoding order sequence 406 and a subsequent source picture selection order 408 for the plurality of multimedia pictures 302 of FIG. 3. In an embodiment, the plurality of multimedia pictures 302 are received along with the capture order sequence 304 and the encoding order sequence 406 by the processor module 202. Initially, at least one preselected motion estimation parameter is set to a minimum initial value (e.g., (0, 0), wherein each of the temporal predictors and the mean motion vector are set to 0) and the preselected temporal distance value is set to a large value, such as, for example, 100. The first multimedia picture in the encoding order is $P_8$. The motion estimation/compensation for $P_8$ is performed by computing temporal predictors and a mean motion vector by referring to $IDR_0$. The multimedia picture $P_8$ is then encoded (e.g., using the encoding module 208) based on the computed temporal predictors and the mean motion vector.

Upon encoding the multimedia picture $P_8$, a temporal distance between $P_8$ and reference picture associated with $P_8$ (e.g. $IDR_0$) is computed as 8 temporal distance units. In one embodiment, the computed temporal distance for $P_8$ may correspond to the minimum temporal distance value (since $P_8$ has a single corresponding reference picture). The minimum temporal distance value (e.g., 8) is compared with the preselected minimum temporal distance value, such as, for example, 100. Upon or subsequent to determining that the minimum temporal distance is less than the preselected temporal distance value, $P_8$ is selected as a source picture for computing at least one motion estimation parameter from $P_8$ to be used for encoding a number (e.g., one or more) of subsequent multimedia pictures. Furthermore, the preselected temporal distance value is updated to 8 temporal distance units based on a temporal distance between $P_8$ and the reference picture associated with $P_8$ (e.g., $IDR_0$). At least one motion estimation parameter (e.g., a set of temporal predictors and a mean motion vector) is determined from the selected source picture $P_8$, and the at least one preselected motion estimation parameter is updated based on the motion estimation parameters determined from $P_8$.

Subsequently, a second multimedia picture $B_4$ that is to be encoded pursuant to the encoding order sequence 406 is encoded, such as, for example, by the encoding module 208, based on the at least motion parameter determined from the selected source picture $P_8$. Upon or subsequent to an encoding of $B_4$, the processor module 202 computes at least one temporal distance between $B_4$ and one or more reference pictures associated with $B_4$ in the capture order sequence 302. According to the capture order sequence 302, the reference pictures for $B_4$ are $P_8$ and $IDR_0$, and, accordingly, the temporal distance values are computed to be 4 in both a forward reference region and a backward reference region. Accordingly, the minimum temporal distance is computed to be 4. The minimum temporal distance of 4 is compared with the updated preselected temporal distance value of 8, and, upon or subsequent to determining that minimum temporal distance value is less than the updated preselected temporal distance value of 8, $B_4$ is selected as the source picture for computing at least one motion estimation parameter from $B_4$ that may be used to encode a number (e.g., one or more) of subsequent multimedia pictures. The preselected temporal distance value is updated to 4, and the at least one motion parameter is updated to at least one motion parameter determined from the selected source picture $B_4$.

Subsequently, a third multimedia picture $B_2$ that is to be encoded pursuant to the encoding order sequence 406 is encoded, such as, for example, by the encoding module 208, based on the at least one motion parameter that is determined from the selected source picture $B_4$. Upon or subsequent to an encoding of the third multimedia picture $B_2$, the processor module 202 computes at least one temporal distance between $B_2$ and one or more reference pictures associated with $B_2$ in the capture order sequence 302. According to the capture order sequence 302, the reference pictures for $B_2$ are $B_4$ and $IDR_0$, and, accordingly, the temporal distance values are computed to be 2 in both the forward and backward reference regions. Accordingly, the minimum temporal distance is computed to be 2. The minimum temporal distance of 2 is compared with the updated preselected temporal distance value of 4, and upon or subsequent to determining that the minimum temporal distance value is less than the updated preselected temporal distance value of 4, $B_2$ is selected as the source picture for encoding a number (e.g., one or more) of subsequent multimedia pictures. The preselected temporal distance value is updated to 2, and the at least one motion parameter is updated to at least one motion parameter determined from the selected source picture $B_2$. Similarly, the multimedia pictures $B_2$, $B_6$, $B_1$, $B_3$, $B_5$, and $B_7$ are selected as source pictures for computing at least one motion estimation parameter to be implemented for motion estimation of the subsequent multimedia pictures $B_6$, $B_1$, $B_3$, $B_5$, $B_7$, and $P_{16}$ in the encoding order 406, respectively.

The multimedia picture $P_{16}$ is encoded, such as, for example, by the encoding module 208, based on the at least motion parameter that is determined from the selected source picture $B_7$. Upon or subsequent to an encoding of $P_{16}$, the processor module 202 computes at least one temporal distance between $P_{16}$ and one or more reference pictures associated with $P_{16}$ in the capture order sequence 302. According to the capture order sequence 302, the reference picture for $P_{16}$ is $P_8$, and, accordingly, the temporal distance value is computed to be 8 in the forward reference region. Accordingly, the minimum temporal distance is computed to be 8. The minimum temporal distance of 8 is compared with the updated preselected temporal distance value of 1 (which corresponds to the multimedia picture $B_7$), and, upon or subsequent to determining that minimum temporal distance value is greater than the updated preselected temporal distance value of 1, $P_{16}$ is not selected as the source picture for encoding a number (e.g., one or more) of subsequent multimedia pictures. The preselected temporal distance value remains to be 1, and the at least one motion parameter remains to be at least one motion parameter determined from the previously selected source picture $B_7$.

Subsequently, a multimedia picture $B_{12}$ is encoded, such as, for example, by the encoding module 208, based on the at least one motion parameter determined from the source picture $B_7$. Upon or subsequent to an encoding of $B_{12}$, the processor module 202 computes at least one temporal distance between $B_{12}$ and one or more reference pictures associated with $B_{12}$ in the capture order sequence 302. According to the capture order sequence 302, the reference pictures for $B_{12}$ are $P_8$ and $P_{16}$, and, accordingly, the temporal distance values are computed to be 4 in both the forward and backward reference regions. Accordingly, the minimum temporal distance is computed to be 4. The minimum temporal distance of 4 is compared with the updated preselected temporal distance value of 1, and, upon or subsequent to determining that the minimum temporal distance value is greater than the updated preselected temporal distance value of 1, $B_{12}$ is not selected as the source picture for encoding a number (e.g., one or more) of subsequent multimedia pictures. The preselected temporal distance value remains to be 1, and the at least one motion parameter remains to be at least one motion parameter determined from the source picture $B_7$.

Similarly, the multimedia picture $B_7$ is utilized as the source picture for computing at least one motion estimation parameter to be implemented for motion estimation of the subsequent multimedia pictures $B_{10}$, $B_{14}$, and $B_9$ in the encoding order 406, and the multimedia picture $B_9$, $B_{11}$, and $B_{13}$ are utilized as the source pictures for computing at least one motion estimation parameter to be implemented for motion estimation of the subsequent multimedia pictures $B_{11}$, $B_{13}$, and $B_{15}$, respectively, in the encoding order 406. The motion estimation parameters computed based on the scheme 400 of FIG. 4 are reliable, and, accordingly, the scheme 400 leads to an improvement in overall video compression efficiency. The scheme 400 of FIG. 4 is implementable in progressive multimedia content. However, for interlaced multimedia content, the preselected temporal distance value is maintained at a value that is greater than or equal to two temporal distance units such that an optimal video compression efficiency may be achieved. In an embodiment, an encoding of an interlaced multimedia content may involve an adaptive field referencing pattern encoding of multimedia pictures. A source picture selection scheme that may be implemented to estimate motion in interlaced multimedia content subjected to encoding based on the adaptive field referencing pattern is described further herein with reference to FIG. 5.

Figure 5:
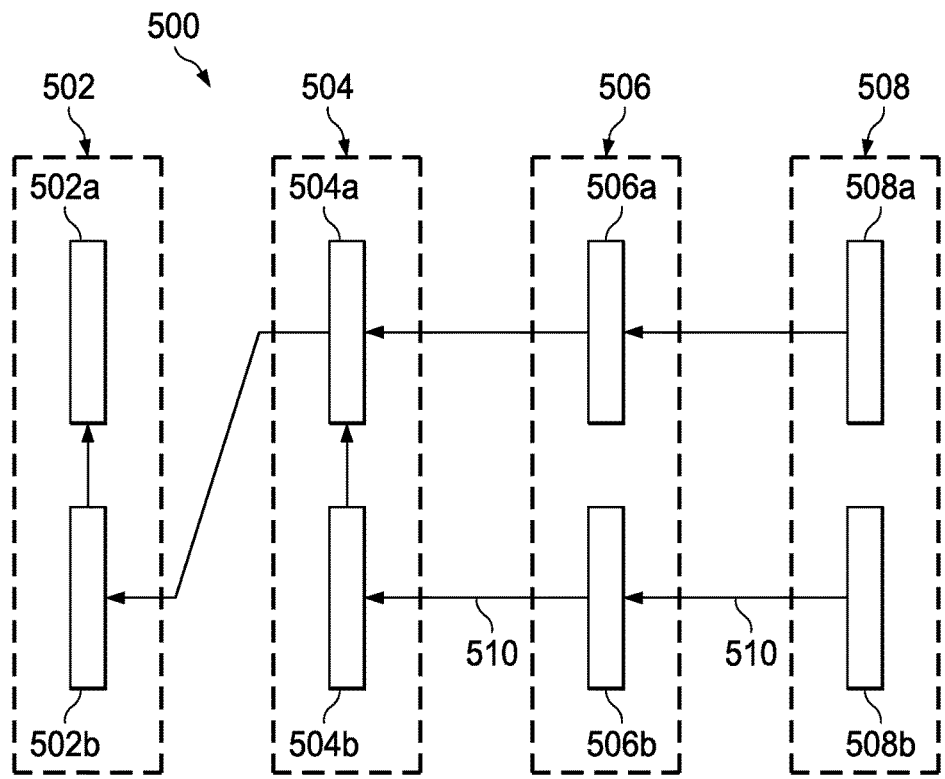
FIG. 5 is a schematic view illustrating an exemplary adaptive field referencing pattern that may be implemented to encode interlaced multimedia content according to an embodiment.

FIG. 5 is a schematic view illustrating an exemplary adaptive field referencing pattern 500 that may be implemented to encode interlaced multimedia content, according to an embodiment. The interlaced multimedia content of FIG. 5 includes a plurality of multimedia frames including, for example, frame N 502, frame N+1 504, frame N+2 506, and frame N+3 508 in a capture order, wherein N is a positive integer. Each multimedia frame from among the plurality of multimedia frames (e.g., frames 502-508) includes a top field (e.g., top fields 502a, 504a, 506a, and 508a) and a bottom field (e.g., bottom fields 502b, 504b, 506b, and 508b). The plurality of multimedia frames (e.g., frames 502-508) are captured in an order starting from the top field 502a, followed by the bottom field 502b, the top field 504a, the bottom field 504b, the top field 506a, the bottom field 506b, the top field 508a, and the bottom field 508b. The adaptive field referencing pattern 500 depicted in FIG. 5 toggles between a most recently coded field (MRF) referencing pattern and a same parity field (SPF) referencing pattern.

In the adaptive field referencing pattern 500, a reference field may either be the MRF or the SPF. The adaptive field referencing pattern 500 comprises the MRF when a top field is encoded based on a bottom field, and vice versa, wherein the top field and the bottom field belong to the same or different multimedia frames. In the adaptive field referencing pattern 500 of FIG. 5, the arrows, such as arrows 510, illustrate a dependence (or an association) of a field on (or with) another field, such that a reference field for encoding purposes is established.

As indicated by the arrows 510, the bottom field 502b of frame N 502 is encoded by referencing the top field 502a of the frame N 502, the top field 504a of frame N+1 504 is encoded by referencing the bottom field 504b of the frame N 502, and the bottom field 504b of the frame N+1 504 is encoded by referencing the top field 504a of the frame N+1 504. The top field 502a and the bottom field 502b of the frame N 502 and the top field 504a and the bottom field 504b of the frame N+1 504 are consequently MRFs. The adaptive field referencing pattern 500 constitutes the SPF when a top field of a first frame is encoded based on a top field of a second frame, and a bottom field of the first frame is encoded based on a bottom field of the second frame. Accordingly, each of the top field 506a of frame N+2 506, the top field 508a of frame N+3 508, the bottom field 506b of frame N+2 506, and the bottom field 508b of frame N+3 508 are SPFs. As explained earlier herein with reference to FIGS. 3 and 4, in order to select at least one motion estimation parameter so as to estimate a motion of each of the plurality of multimedia frames (e.g., 502-508), the processor module 202 receives the plurality of multimedia frames (e.g., 502-508) in the capture order. Initially, at least one preselected motion estimation parameter is set to minimum initial values (e.g., (0, 0), wherein each of the temporal predictors and the mean motion vector are set to a value of 0).

The processor module 202 receives the top field 502a, and the encoding module 208 or the multimedia encoder encodes the top field 502a based on the minimum initial values (e.g., (0, 0)) of the preselected motion estimation parameter. Upon or subsequent to receiving the bottom field 502b, the processor module 202 selects the top field 502a as a source picture for computing at least one motion estimation parameter to be implemented for estimating a motion of the bottom field 502b. The motion estimation module 204 computes at least one motion estimation parameter for the bottom field 502b based on the top field 502a. The motion estimation module 204 estimates motion in the bottom field 502b based on the computed at least one motion estimation parameter. Subsequent to estimating motion in the bottom field 502b, the encoding module 208 encodes the bottom field 502b. Upon or subsequent to receiving the top field 504a, the processor module 202 computes a temporal distance between the previously encoded bottom field 502b and the top field 502a. The temporal distance between the bottom field 502b and the top field 502a is one temporal distance unit. The processor module 202 compares the temporal distance with a preselected temporal distance value that is substantially equivalent to two temporal distance units. The temporal distance between the bottom field 502b and the top field 502a of one temporal distance unit less than the preselected temporal distance value of two temporal distance units.

Consequently, the processor module 202 selects the bottom field 502b as a source picture for computing at least one motion estimation parameter for motion estimation of the top field 504a. The motion estimation module 204 determines at least one motion estimation parameter based on the selected bottom field 502b and estimates motion in the top field 504a based on the determined at least one motion estimation parameter. Based on the motion estimation, encoding module 208 encodes the top field 504a. The motion estimation module 204 updates the preselected at least one motion estimation parameter to the motion estimation parameter computed from the bottom field 502b such that motion in the subsequent fields may be estimated. The temporal distance between each of the SPFs and the corresponding reference fields is two temporal distance units in the capture order. By maintaining the preselected temporal distance value at two temporal distance units and not updating the preselected temporal distance value during every iteration of motion estimation, the source pictures selected by the processor module 202 will be arranged or positioned (upon or subsequent to a transition from an MRF to an SPF (e.g., upon or subsequent to receiving the bottom field 506b)) in the vicinity of the fields to be motion estimated. In so much as the source fields are selected in the vicinity of the fields to be motion estimated, a recurrence of the source pictures in or during a motion estimation of subsequent fields is prevented, thereby improving (1) the reliability of the motion estimation parameters that are computed and (2) overall video compression efficiency.

For example, upon or subsequent to receiving the bottom field 506b, the processor module 202 computes a temporal distance between the top field 506a and the top field 504a that is referenced by the top field 506a. The processor module 202 determines that the computed at least one temporal distance is two temporal distance units. The processor module 202 compares the computed at least one temporal distance of two temporal distance units with the preselected temporal distance value of two temporal distance units. In so much as the computed at least one temporal distance is equal to the preselected temporal distance unit, the processor module 202 selects the top field 506a as the source picture for the bottom field 506b. The motion estimation module 204 computes at least one motion estimation parameter for the bottom field 506b based on the top field 506a selected as the source picture. The motion estimation module 204 estimates the motion of the bottom field 506b based on the computed at least one motion estimation parameter. Furthermore, the motion estimation module 204 updates the preselected at least one motion estimation parameter by changing the value of the preselected at least one motion estimation parameter to the value of the determined at least one motion estimation parameter based on the top field 506a. Similarly, at least one motion estimation parameter that is computed based on frame N+1 is used for a motion estimation of frame N+2, and at least one motion estimation parameter that is computed based on frame N+2 is used for a motion estimation of frame N+3, and so on.

Figure 6A:
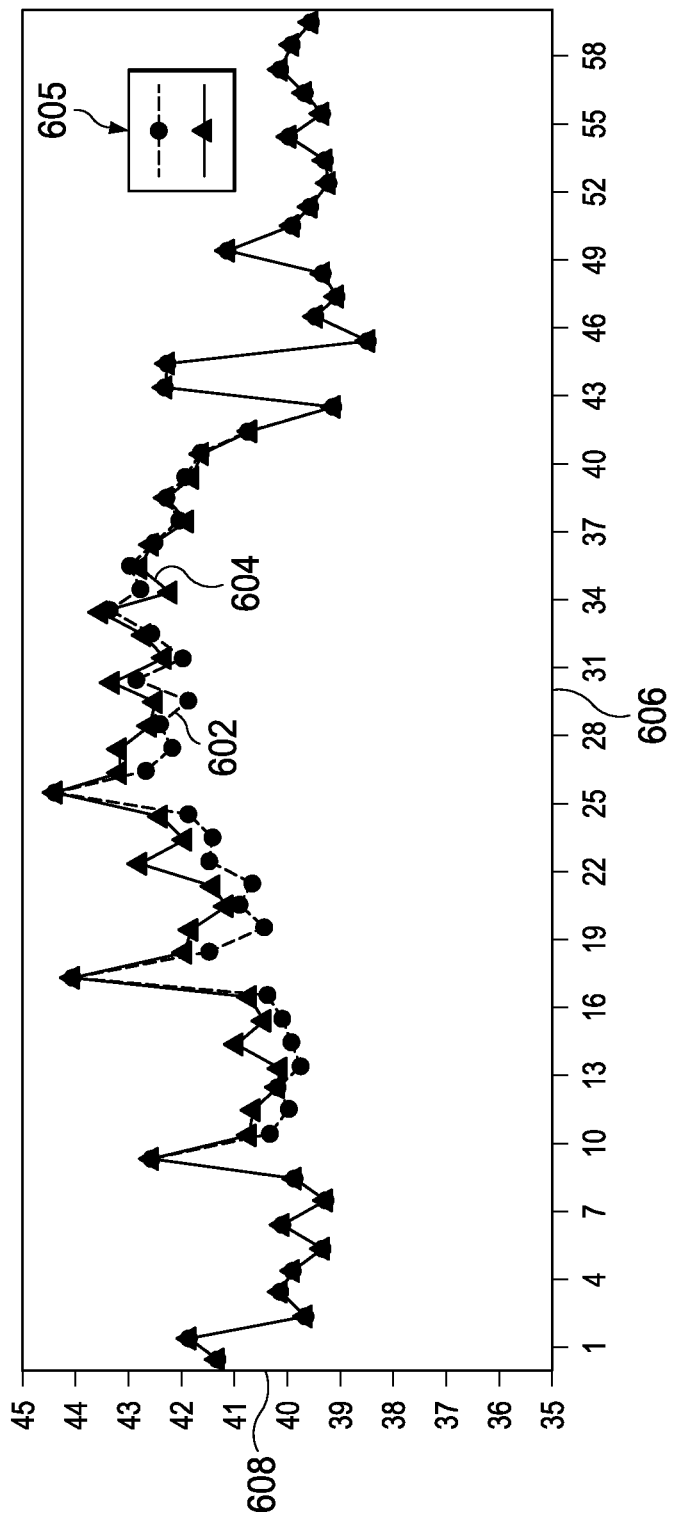

FIGS. 6A and 6B illustrate an improvement of a perceptual multimedia quality on performing a source picture selection as explained in FIG. 4, pursuant to an exemplary scenario. In particular, FIG. 6A depicts a pair of peak signal to noise ratio (PSNR) traces including a first PSNR trace 602 and a second PSNR trace 604 according to an embodiment. Each of the first PSNR trace 602 and the second PSNR trace 604 is a plot of PSNR observed across a plurality of multimedia pictures. The first PSNR trace 602 and the second PSNR trace 604 may be distinguished based on an exemplary point line trace 605. In FIG. 6A, a reference index of pictures corresponding to the multimedia pictures is plotted on the X-axis 606, and the corresponding PSNR is plotted on the Y-axis 608. The first PSNR trace 602 corresponds to a plot of variation in PSNR observed for motion estimation performed based on a scheme of encoding each multimedia picture based on the most recently encoded P-picture, and the second PSNR trace 604 corresponds to a plot of variation in PSNR observed for motion estimation performed based the source picture selection as explained in FIG. 4.

For purposes of illustration, the following exemplary PSNR values are listed along the Y-axis axis 608: 35, 36, 37, 38, 39, 40, 41, 42, 43, 44, and 45. Additionally, for purposes of illustration, the following exemplary reference indices corresponding to the multimedia pictures are listed along the X-axis 606: 1, 4, 7, 10, 13, 16, 19, 22, 25, 28, 31, 34, 37, 40, 43, 46, 49, 52, 55, and 58. It can be observed that the second PSNR trace 604 achieves a significantly higher PSNR than the first PSNR trace 602 for most of the multimedia pictures. The motion estimation performed based on source picture selection of FIG. 4 improves the PSNR, thereby improving a perceptual multimedia quality. The improvement in the perceptual multimedia quality may be assessed based on a reduction in visible artifacts caused by a degradation of decoded multimedia data due to the encoding or decoding processes.

FIG. 6B illustrates exemplary bit rate traces associated with the encoding of multimedia data pursuant to an exemplary scenario. A bit rate trace is a plot of a variation in a number of bits consumed during the encoding of a plurality of multimedia pictures. In FIG. 6B, a reference index of the multimedia pictures is plotted on the X-axis 612, and the corresponding number of bits consumed is plotted on the Y-axis 614. For purposes of illustration, the following exemplary bit rate values (in units of bits per second) are listed along the Y-axis 614: 0, 20000, 40000, 60000, 80000, 100000, 120000, 140000, 160000, 180000, and 200000. Additionally, for purposes of illustration, the following exemplary reference indices corresponding to the multimedia pictures are listed along the X-axis 612: 1, 4, 7, 10, 13, 16, 19, 22, 25, 28, 31, 34, 37, 40, 43, 46, 49, 52, 55, and 58. The exemplary bit rate traces of FIG. 6B include a first bit rate trace 616 and a second bit rate trace 618. The first bit rate trace 616 and the second bit rate trace 618 may be distinguished based on an exemplary point line trace 620. The first bit rate trace 616 corresponds to multimedia pictures encoded based on a motion estimation performed using a previously encoded P-picture. A second bit trace 618 corresponds to an encoding of multimedia pictures based on the source picture selection of FIG. 4. It may be observed that the second bit trace 618 achieves lower bit rates when compared to the first bit rate trace 616. The source picture selection of FIG. 4 results in a reduction in the bit-rate, thereby leading to an improvement in multimedia quality. A method of performing a motion estimation of a plurality of multimedia pictures is explained herein with reference to FIG. 7.

Figure 7:
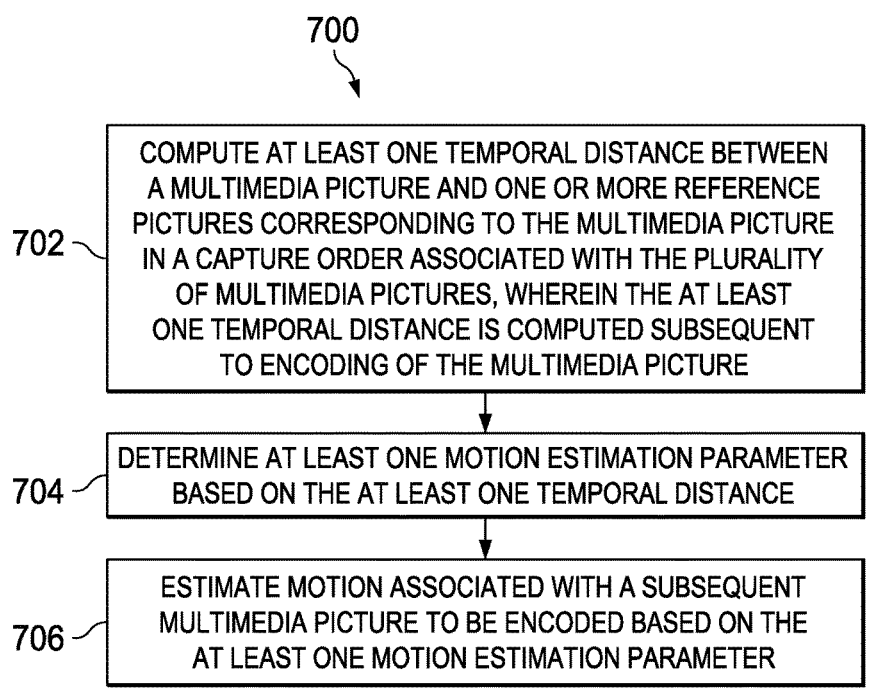
FIG. 7 is a flow diagram of a method of performing motion estimation in a plurality of multimedia pictures according to an embodiment.

FIG. 7 is a flow diagram of a method 700 for estimating motion in a plurality of multimedia pictures according to an embodiment. The method 700 may be performed by a processor which may include a multi-core processor, a single core processor, or combination of multi-core processors and single core processors. In an example embodiment, the processor may be embodied as one more of a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor may be configured to perform functions that are depicted to be implemented through modules, such as processor module 202, motion estimation module 204 and encoding module 208 of FIG. 2. Examples of the plurality of multimedia pictures may include, for example, multimedia frames, multimedia fields, and the like. The plurality of multimedia pictures may be associated with, for example, a progressive multimedia content, an interlaced multimedia content, and the like. The method 700 starts at operation 702. At operation 702, at least one temporal distance between a multimedia picture and one or more reference pictures corresponding to the multimedia picture in a capture order associated with the plurality of multimedia pictures is computed. The computation of the at least one temporal distance may be performed as explained herein with reference to FIG. 3.

Furthermore, a minimum temporal distance from among the at least one temporal distance between the multimedia picture and the one or more reference pictures is determined.

For example, if the multimedia picture is a B-picture, the multimedia picture includes a pair of reference pictures and, correspondingly, is associated with a pair of temporal distances corresponding to the pair of reference pictures (e.g., a first temporal distance between the B-picture and a first reference picture and a second temporal distance between the B-picture and a second reference picture). The lesser of the first temporal distance and the second temporal distance is computed as the minimum temporal distance. The minimum temporal distance is compared with a preselected temporal distance value. Upon or subsequent to determining that the minimum temporal distance is less than or equal to the preselected temporal distance value, the multimedia picture is selected as a source picture for computing at least one motion estimation parameter for motion estimation in the subsequent multimedia picture.

At operation 704, at least one motion estimation parameter is determined based on the at least one temporal distance. The motion estimation parameter includes, but is not limited to, a set of temporal predictors and/or a mean motion vector. The mean motion vector (e.g. a global motion vector) corresponds to a mean, or average, of all motion vectors in one or more regions of interest (e.g., one or more rows of macro blocks) of a source picture selected for computing the at least one motion estimation parameter for estimating motion in a subsequent multimedia picture. Upon or subsequent to a selection of the multimedia picture as the source picture, the at least one motion estimation parameter is computed from the multimedia picture. In an embodiment, the at least one motion estimation parameter is determined based on a backward reference picture (e.g., a temporally succeeding reference picture in an encoding order) associated with the multimedia picture that is selected as the source picture. In an embodiment, the at least one motion estimation parameter is determined based on a forward reference picture (e.g., a temporally preceding reference picture in the encoding order) associated with the multimedia picture that is selected as the source picture.

In an embodiment, upon or subsequent to a selection of the multimedia picture, the preselected temporal distance value is updated to a value corresponding to the minimum temporal distance. In an embodiment, the preselected at least one motion estimation parameter is updated to at least one motion estimation parameter computed from the selected multimedia picture upon or subsequent to a selection of the multimedia picture. In an embodiment, upon or subsequent to the plurality of multimedia pictures being associated with interlaced multimedia content, an adaptive field referencing pattern is selected for encoding. Upon or subsequent to a selection of an adaptive field referencing pattern that may be implemented to encode the plurality of multimedia pictures, the preselected temporal distance value is chosen to be greater than or equal to two temporal distance units. Also, upon or subsequent to a selection of the multimedia picture as the source picture, the preselected at least one motion estimation parameter is updated while the preselected temporal distance value is maintained at a value greater than or equal to two temporal distance units, as described herein with reference to FIG. 5.

At operation 706, motion associated with a subsequent multimedia picture to be encoded is estimated based on the at least one motion estimation parameter including the updated at least one preselected motion estimation parameter (e.g., upon or subsequent to selection of the multimedia picture as the source picture). Upon or subsequent to determining that the minimum temporal distance is greater than a preselected temporal distance value, the motion associated with the subsequent multimedia picture is estimated based on at least one preselected motion estimation parameter, as explained herein with reference to FIGS. 3 and 4. The subsequent multimedia picture is encoded based on the estimated motion associated with the subsequent multimedia picture. A source picture may be selected for each multimedia picture from among a plurality of subsequent multimedia pictures and at least one motion estimation parameter determined from the selected source picture may be implemented to encode subsequent multimedia pictures, as explained herein with reference to FIG. 4. A method of selecting at least one motion estimation parameter is explained herein with reference to FIGS. 8A-8B.

Figure 8B:
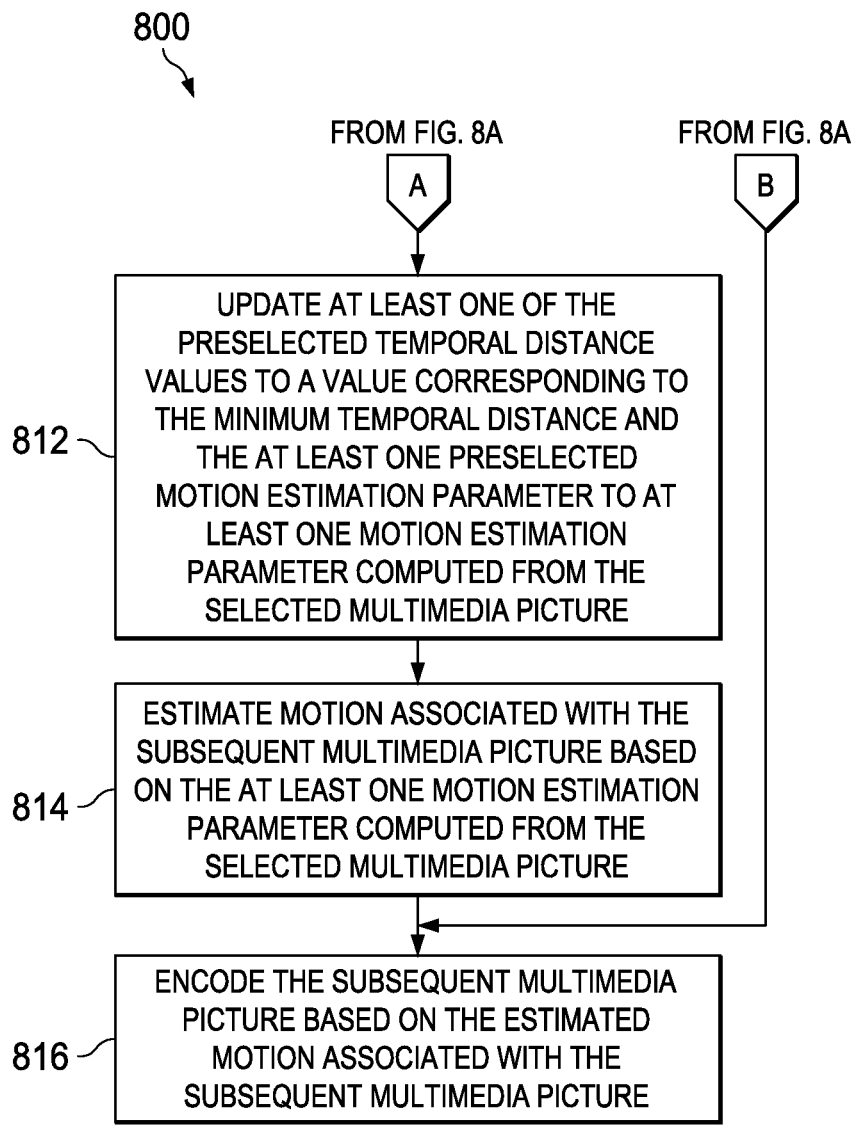

FIGS. 8A-8B depict a flow diagram of a method 800 of source picture selection that may be implemented to estimate motion associated with a plurality of multimedia pictures, according to an embodiment. The plurality of multimedia pictures may include, multimedia frames, fields, and the like. Also the plurality of multimedia pictures may be associated with a progressive multimedia content, an interlaced multimedia content, and the like. The method 800 starts at operation 802. At operation 802, a minimum temporal distance from among at least one temporal distance between the multimedia picture and the one or more reference pictures is determined (e.g., using processor module 202 of FIG. 2). The minimum temporal distance is computed subsequent to encoding of the multimedia picture. The computation of the minimum temporal distance may be performed as explained in FIG. 3.

At operation 804, the minimum temporal distance is compared with a preselected temporal distance value. If the minimum temporal distance is less than or equal to the preselected temporal distance value, then operation 806 is performed. If the minimum temporal distance value is greater than the preselected temporal distance value then operation 810 is performed.

At operation 806, upon or subsequent to determining the minimum temporal distance to be less than or equal to the preselected temporal distance value, the multimedia picture is selected as a source picture for computing at least one motion estimation parameter for motion estimation in a subsequent multimedia picture. The selection of the multimedia picture as the source picture may be performed as explained in FIG. 4. At operation 808, the at least one motion estimation parameter is computed (e.g., using motion estimation module 204 of FIG. 2) from the multimedia picture upon or subsequent to selection of the multimedia picture as the source picture. In an embodiment, the at least one motion estimation parameter is determined based on a backward reference picture (a temporally succeeding reference picture in an encoding order) associated with the multimedia picture selected as the source picture. In an embodiment, the least one motion estimation parameter is determined based on a forward reference picture (a temporally preceding reference picture in the encoding order) associated with the multimedia picture selected as the source picture. At operation 810, motion associated with the subsequent multimedia picture is estimated (e.g., using motion estimation module 204 of FIG. 2) based on a preselected at least one motion estimation parameter upon or subsequent to determining the minimum temporal distance to be greater than a preselected temporal distance value.

At operation 812, the preselected temporal distance value is updated (e.g., using motion estimation module 204 of FIG. 2) to a value corresponding to the minimum temporal distance and/or the preselected at least one motion estimation parameter is updated to at least one motion estimation parameter computed from the selected multimedia picture. In an embodiment, upon or subsequent to the multimedia picture including a field associated with an interlaced multimedia content, the preselected at least one motion estimation parameter alone is updated while maintaining the preselected temporal distance value at a value greater than or equal to two temporal distance units as explained in FIG. 5.

At operation 814, motion associated with the subsequent multimedia picture is estimated (e.g., using motion estimation module 204 of FIG. 2) based on the at least one motion estimation parameter computed from the selected multimedia picture. At operation 816, the subsequent multimedia picture is encoded (e.g., using encoding module 208 of FIG. 2 or a multimedia encoder) based on the estimated motion associated with the subsequent multimedia picture. The encoding may be an interlaced encoding, a progressive encoding, and the like.

Without in any way limiting the scope, interpretation, or application of the claims appearing below, advantages of one or more of the exemplary embodiments disclosed herein include applicability in various coding structures, including but not limited to, an IBBP coding structure, a hierarchical coding structure, and an IPPP coding structure. Furthermore, various embodiments of the present technology enable a dynamic and reliable selection of motion estimation parameters for estimating motion associated with a plurality of multimedia pictures as opposed to other known techniques of selection of motion estimation parameters that use a fixed picture position in a GOP for selection of the motion estimation parameters. The present technology results in an improved motion estimation efficiency in multimedia sequences involving a significant amount of change between the multimedia pictures (e.g., high motion sequences, gradual scene change sequences, or sequences with a large GOP size). Also, the method disclosed herein is computationally simple to be implemented in a multimedia encoder, with the need to merely change one or more frame level operations, hardly impacting the real time performance of the multimedia encoder.

Additionally, the usage of the present technology leads to a gain in peak signal to noise ratio. Moreover, the methods and systems disclosed herein help reduce a search range and thereby achieve the best quality in a given scheme. The reduction in the search range results in lowering an amount of reference data transferred and/or an internal memory foot print of a reference region. Also, the reduction in the search range leads to a lot of savings in a memory transfer rate for each macro block, the savings being more pronounced in higher resolution. The methods and systems of the present technology result in both reduction of bit-rate as well as improvement in a multimedia quality.

Although the present technology has been described with reference to specific exemplary embodiments, it is noted that various modifications and changes may be made to these embodiments without departing from the broad spirit and scope of the present technology. For example, the various devices, modules, analyzers, generators, etc., described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various electrical structures and methods may be embodied using transistors, logic gates, and electrical circuits (e.g., application specific integrated circuit (ASIC) circuitry and/or in Digital Signal Processor (DSP) circuitry).

Particularly, the system 200, the processor module 202, the motion estimation module 204, the memory module 206, and the encoding module 208 of FIG. 2 may be enabled using software and/or using transistors, logic gates, and electrical circuits (e.g., integrated circuit circuitry such as ASIC circuitry). Embodiments of the present disclosure include one or more computer programs stored or otherwise embodied on a computer-readable medium, wherein the computer programs are configured to cause a processor to perform one or more operations. A computer-readable medium storing, embodying, or encoded with a computer program, or similar language, may be embodied as a tangible data storage device storing one or more software programs that are configured to cause a processor to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method comprising:
    computing, with a processor, a temporal distance between a picture in a sequence of video pictures and one or more reference pictures in the sequence of video pictures, the reference pictures being used to perform motion compensation for the picture;
    determining whether the temporal distance computed for the picture is less than or equal to a minimum temporal distance value, the minimum temporal distance value being less than or equal to temporal distances computed for all previously coded pictures in the sequence of video pictures;
    selecting, with the processor, the picture as a source picture for obtaining seed predictors to use when performing motion estimation for a subsequent picture in response to determining that the temporal distance is less than or equal to the minimum temporal distance value;
    selecting, with the processor, a current source picture as the source picture for obtaining the seed predictors to use when performing the motion estimation for the subsequent picture in response to determining that the temporal distance is not less than or equal to the minimum temporal distance value, the current source picture corresponding to a source picture used for obtaining seed predictors for the picture; and
    performing, with the processor, the motion estimation for the subsequent picture based on the seed predictors obtained from the selected source picture.

2. The method of claim 1, wherein performing the motion estimation includes:
    computing the seed predictors based on the source picture.

3. The method of claim 1, further comprising updating at least one of:
    the minimum temporal distance value to a value corresponding to the temporal distance for the picture; and
    a motion estimation parameter to a motion estimation parameter computed from the selected source picture.

4. The method of claim 1, wherein performing the motion estimation includes determining a motion vector for the subsequent picture, the method further comprising:
    encoding the subsequent picture based on the motion vector for the subsequent picture.

5. The method of claim 1, wherein the minimum temporal distance value is greater than or equal to two temporal distance units for an adaptive field referencing pattern encoding of pictures.

6. The method of claim 1, wherein the seed predictors include at least one of a set of temporal predictors and a mean motion vector, wherein the mean motion vector corresponds to a mean of all motion vectors in one or more regions of interest of the source picture selected for the subsequent picture.

7. A computer implemented method comprising:
    computing, with a processor, a temporal distance between a picture in a sequence of video pictures and one or more reference pictures in the sequence of video pictures, the reference pictures being used to perform motion compensation for the picture;
    determining, with the processor, whether the temporal distance computed for the picture is less than or equal to a minimum temporal distance value, the minimum temporal distance value being less than or equal to temporal distances computed for all previously coded pictures in the sequence of video pictures;
    selecting, with the processor, a source picture for obtaining seed predictors to use when performing motion estimation for a subsequent picture based on whether the temporal distance computed for the picture is less than or equal to the minimum temporal distance value; and
    performing, with the processor, the motion estimation for the subsequent picture based on the seed predictors obtained from the selected source picture.

8. The computer implemented method of claim 7, wherein performing the motion estimation includes:
    computing the seed predictors based on the source picture.

9. The computer implemented method of claim 7, further comprising:
    updating the minimum temporal distance value to a value corresponding to the minimum temporal distance for the picture.

10. The computer implemented method of claim 7, wherein performing the motion estimation includes determining a motion vector for the subsequent picture, the method further comprising:
    encoding the subsequent picture based on the motion vector for subsequent picture.

11. The computer implemented method of claim 8, wherein the seed predictors include at least one of a set of temporal predictors and a mean motion vector, wherein the mean motion vector corresponds to a mean of all motion vectors in one or more regions of interest of the source picture selected for the subsequent picture.

12. A system comprising:
    a processor circuit configured to:
    compute a temporal distance between a picture in a sequence of video pictures and one or more reference pictures in the sequence of video pictures, the reference pictures being used to perform motion compensation for the picture;
    determine whether the temporal distance computed for the picture is less than or equal to a minimum temporal distance value, the minimum temporal distance value being less than or equal to temporal distances computed for all the previously coded pictures in the sequence of video pictures;
    select one or more seed predictors to use when performing motion estimation for a subsequent picture based on whether the temporal distance computed for the picture is less than or equal to a minimum temporal distance value; and
    perform the motion estimation for the subsequent picture based on the determined seed predictors.

13. The system of claim 12, wherein the processor circuit is further configured to:
    select a source picture used for determining the seed predictors based on whether the temporal distance computed for the picture is less than or equal to a minimum temporal distance value; and
    compute the seed predictors based on the source picture.

14. The system of claim 12, wherein the processor circuit is further configured to update the minimum temporal distance value to a value corresponding to the temporal distance for the picture.

15. The system of claim 12, wherein the processor circuit is further configured to:
    determine a motion vector for the subsequent picture; and
    encode the subsequent picture based on the motion vector for the subsequent picture.

16. The system of claim 12, wherein the minimum temporal distance value is greater than or equal to two temporal distance units for an adaptive field referencing pattern encoding of pictures.

17. The system of claim 13, wherein the seed predictors include at least one of a set of temporal predictors and a mean motion vector, wherein the mean motion vector corresponds to a mean of all motion vectors in one or more regions of interest of the source picture selected for the subsequent picture.

* * * * *